United States Patent [19]
Wilson

[11] Patent Number: 5,228,577
[45] Date of Patent: Jul. 20, 1993

[54] APPARATUS FOR SEPARATING HOUSEHOLD TRASH

[76] Inventor: Terry D. Wilson, 616 County Rd. 700, Cullman, Ala. 35055

[21] Appl. No.: 852,767

[22] Filed: Mar. 17, 1992

[51] Int. Cl.$^5$ ............................................. B07C 7/04
[52] U.S. Cl. .................................... 209/702; 193/33; 193/31 A; 209/942; 209/655; 209/941; 209/933
[58] Field of Search ............. 193/33, 31 R, 31 A; 209/702, 703, 942, 655, 698, 941, 657, 933

[56] References Cited

U.S. PATENT DOCUMENTS

| | | | |
|---|---|---|---|
| 389,589 | 9/1888 | Metcalf | 193/31 R |
| 1,527,495 | 2/1925 | Torske | 193/31 R |
| 1,538,239 | 5/1925 | Claudepierre | 193/33 |
| 2,292,615 | 8/1942 | Corbell | 193/31 R |
| 2,586,144 | 2/1952 | Benoit | 193/31 A |
| 2,885,975 | 5/1959 | Campbell | 193/33 |
| 3,842,992 | 10/1974 | Herold | 193/31 R |

FOREIGN PATENT DOCUMENTS 1080481 4/1960 Fed. Rep. of Germany .... 193/31 R

*Primary Examiner*—H. Grant Skaggs
*Attorney, Agent, or Firm*—John C. Garvin, Jr.

[57] ABSTRACT

An apparatus for separating selected categories of solid waste (trash) within a home or building and containing outside of the home or building the various recyclable and non-recyclable solid waste which accumulates within the home or building. The apparatus comprises a main chamber having a sloped floor and two or more aligned bins, two wing-shaped chambers, each wing-shaped chamber having a bin, pivoted doors leading into each aligned bin, a swinging gate leading into each bin within the wing-shaped chambers, and mechanism to be actuated by the homeowner/tenant for opening and/or closing each door and gate depending upon the category of recyclable or non-recyclable solid waste being deposited within the apparatus.

15 Claims, 5 Drawing Sheets

APPARATUS FOR SEPARATING HOUSEHOLD TRASH

TECHNICAL FIELD

This invention relates to an apparatus for separating different categories of recyclable and non-recyclable trash at the source of disposal in new and existing single story or multi-story homes. More particularly, this invention relates to a homeowner/tenant controlled apparatus for separating and bagging selected categories of solid waste (trash) into a plurality of separate containers based upon the recyclable or non-recyclable nature of the solid waste

BACKGROUND OF THE INVENTION

The problem of solid waste disposal has become one of the biggest concerns of everyone throughout the world. For many years it has been the common practice of a vast majority of people to dispose of solid waste at inland and ocean sites. This practice has caused untold environmental problems which must be substantially curtailed. To lessen the environmental problems associated with solid waste disposal, many states, counties and cities have established laws and regulations requiring the separation and recycling of certain solid waste. The recycling of solid waste is beneficial to society from both the standpoints of reducing environmental pollution and energy conservation. For example, many kinds of solid waste such as aluminum cans, plastic bottles, and glass bottles can be recycled and made into new products at a fraction of the energy required to make the products from raw materials.

To implement solid waste recycling, solid waste must be first separated. As set forth above, many states, counties and cities have enacted laws or regulations requiring the separation of solid waste for pick-up and disposal purposes. These laws or regulations typically require the separation of aluminum, recyclable glass, recyclable plastic, and recyclable paper articles from other kinds of non-recyclable solid waste. The separation of the many kinds of recyclable solid waste is especially troublesome for residents of homes due to the shortage of space within the home for sorting, separating and temporarily storing the many different kinds of solid waste.

Several U.S. patents have been granted on apparatuses for disposing of solid waste from within a building to containers located outside of the building and these include: U.S. Pat. No. 1,441,040 (Stephenson); U.S. Pat. No. 3,261,441 (Mullens); U.S. Pat. No. 3,279,685 (Price); U.S. Pat. No. 3,554,345 (Mullens); U.S. Pat. No. 4,987,988 (Messina); and U.S. Pat. No. 5,031,829 (Shantzis).

The Stephenson U.S. Pat. No. 1,441,040 discloses a single garbage container located outside a building for hanging on a window sill of the building for collecting solid waste. Each of the Mullens U.S. Pat. Nos. 3,261,441 and 3,554,345 discloses a solid waste disposal device for partial mounting within an opening in a building that includes a chute connected to the lid of a single solid waste container located outside the building which allows the disposal of the solid waste within the building for collection outside the building The Price U.S. Pat. No. 3,279,685 discloses a solid waste disposal device for partial mounting within an opening in a house that includes a chute for directing solid waste into a selected solid waste container locate outside the house to allow a person to dispose of the solid waste without leaving the house. The Messina U.S. Pat. No. 4,987,988 discloses a refuse collecting, separating and conveying device for recycling various types of solid waste, said device comprising a plurality of openings in a side wall of a building, a separate duct or chute in communication with each opening in the side wall of the building, and a plurality of solid waste container located outside the building for selectively receiving solid waste disposed through a selected opening and duct. The Shantzis U.S. Pat. No. 5,031,829 discloses a system having a single chute for use in a multi-story building to collect into separate containers, supported on a turntable, different categories of solid waste already separated by a tenant for recycling purposes and which includes control means on each floor to enable the tenant to move the turntable to position a selected receptacle beneath the chute for receiving the solid waste being disposed of by the tenant. While these prior art devices may be suitable for the specific purpose to which they address, they are not suitable for the purposes of the present invention.

There is therefore a definite need for a simple, but efficient, apparatus for mounting within a wall or window of a home for selectively separating within the home and containing outside the home the various recyclable and non-recyclable solid waste which accumulates within the home.

Accordingly, it is an object of the present invention to provide an apparatus for a building which allows the separation and containing of recyclable and non-recyclable solid waste.

It is a another object of the present invention to provide an apparatus which can be easily attached to a home for separating and containing several categories of recyclable and non-recyclable solid waste.

It is a further object of the present invention to provide an apparatus which can be readily and easily attached to the wall of a room of a home which permits the separation in several different categories of recyclable and non-recyclable solid waste by a person within the room and containing same outside of the home.

These objects, as well as other objects, of the present invention will become more readily apparent after reading the following description of the preferred embodiment of the invention taken in conjunction with the accompanying drawings.

DESCRIPTION OF THE PREFERRED EMBODIMENTS

Figure 3:
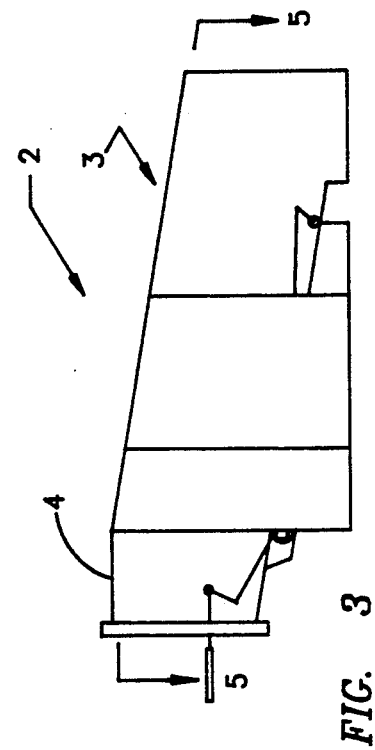
FIG. 3 is a side view of the apparatus of the present invention for separating and containing different categories of recyclable and non-recyclable trash.
Figure 1:
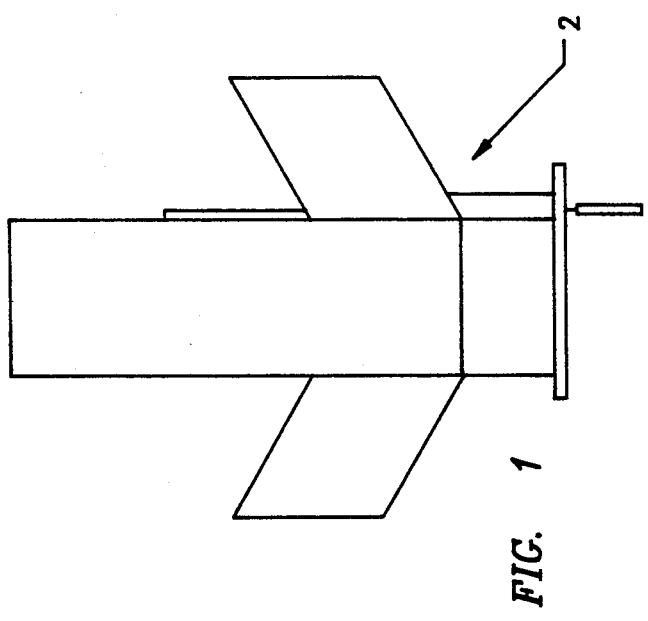
FIG. 1 is a top plan view showing the apparatus of the present invention for separating and containing different categories of recyclable and non-recyclable trash.
Figure 2:
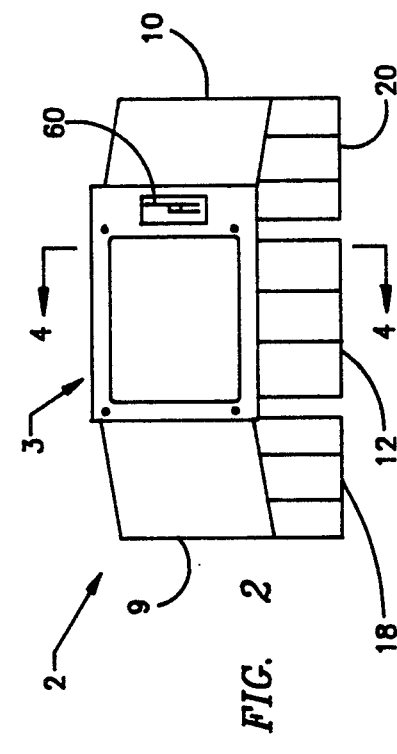
FIG. 2 is a front view showing the apparatus of the present invention for separating and containing different categories of recyclable and non-recyclable trash.
Figure 4:
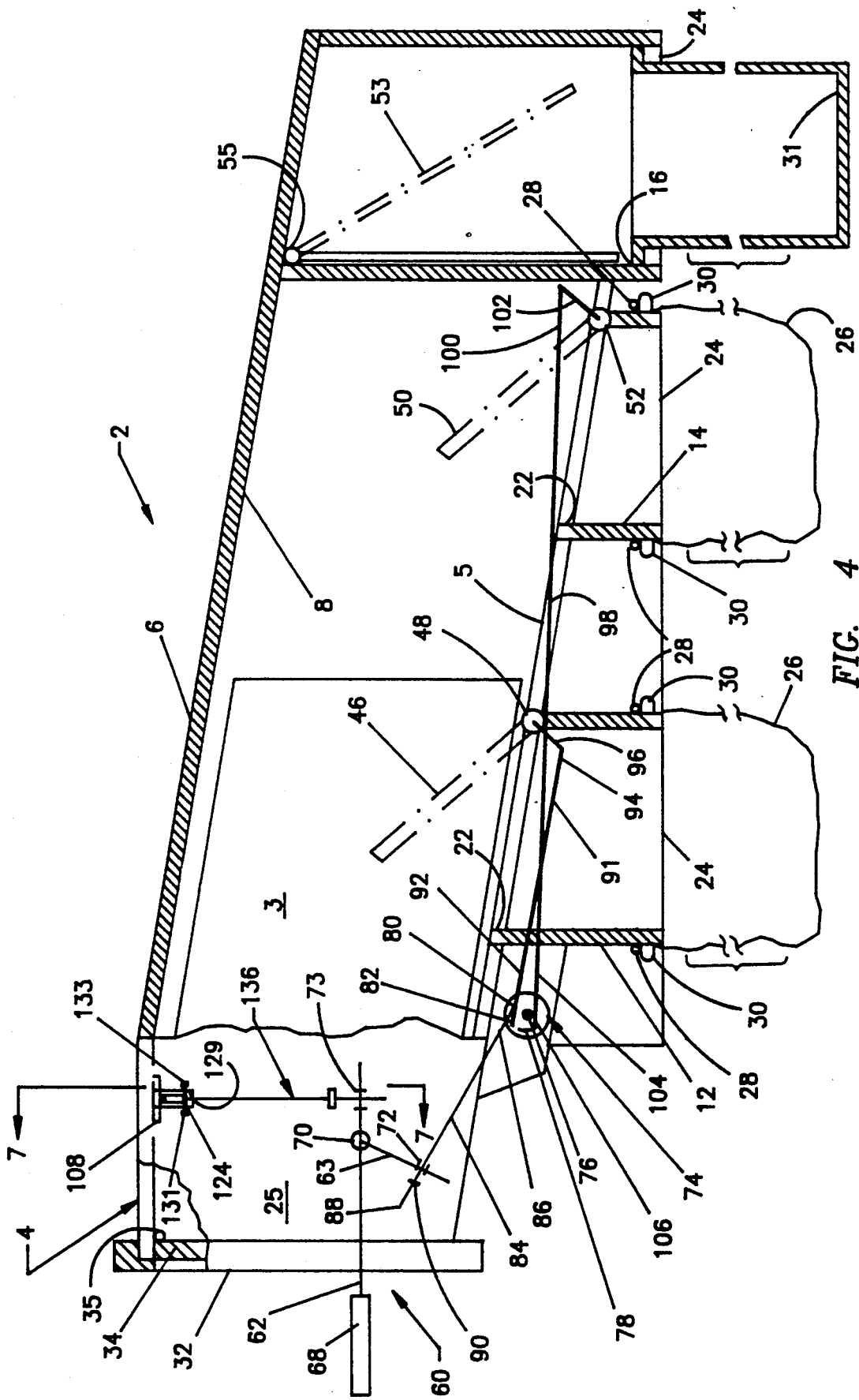
FIG. 4 is a partially broken away sectional view showing the apparatus of the present invention for separating and containing different categories of recyclable and non-recyclable trash taken along line 4—4 of FIG. 2.
Figure 5:
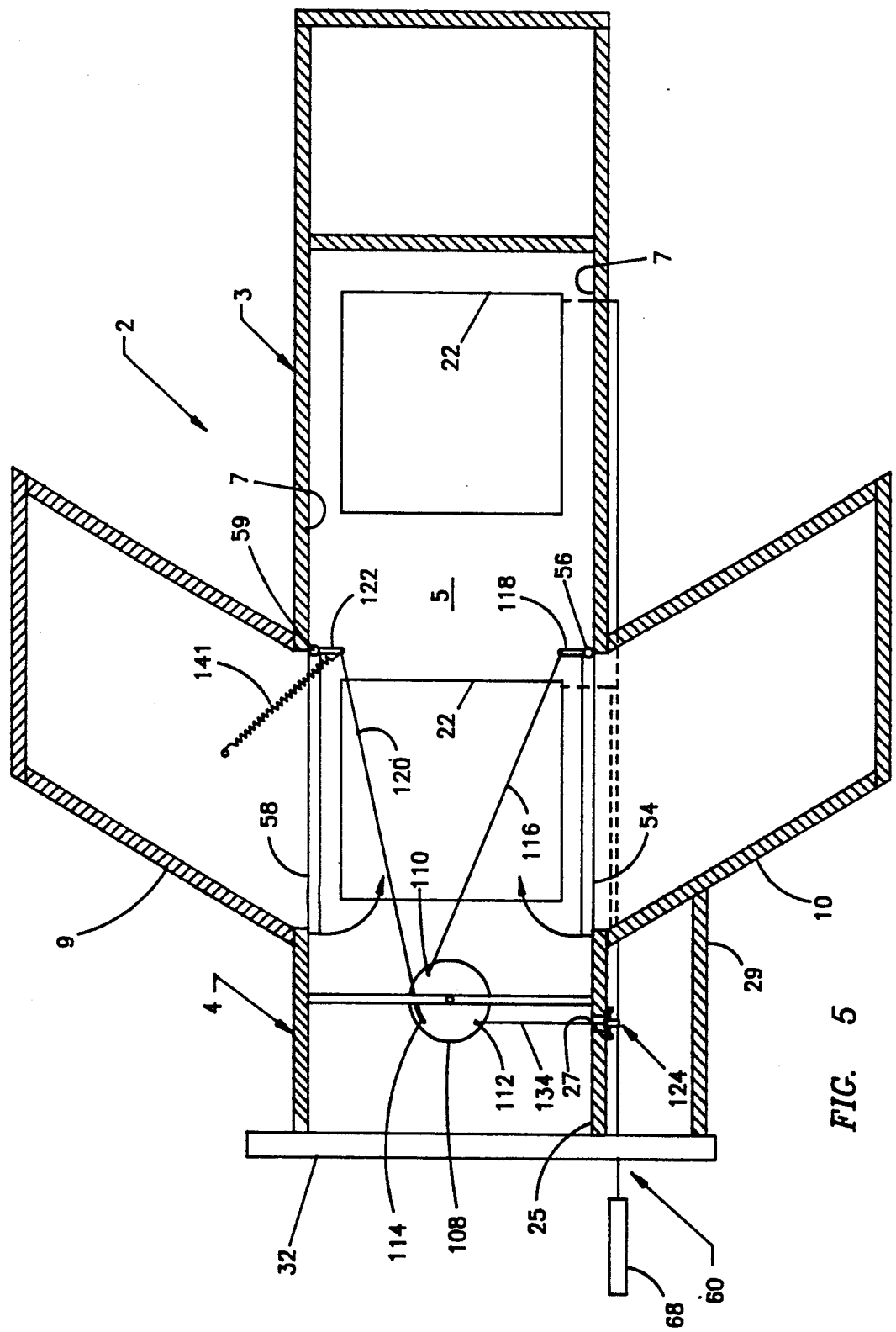
FIG. 5 is a sectional view taken along line 5—5 of FIG. 3 showing the apparatus of the present invention for separating and containing different categories of recyclable and non-recyclable trash.

Referring now to FIGS. 1-5 of the drawings, reference numeral 2 generally designates the apparatus of the preferred embodiment of the present invention for separating and containing recyclable and non-recyclable trash. As best shown in FIGS. 2, 4 and 5, apparatus 2 generally comprises a main generally rectangular chamber 3 having a forward section 4, a sloped floor 5, a top 6, a pair of side walls 7, a ceiling 8, a first wing-shaped chamber 9 extending from main chamber 3, a second wing-shaped chamber 10 extending from main chamber 3, a front bin 12, a middle bin 14, and a rear bin 16 aligned in tandem and a first side bin 18 in first wing-shaped chamber 9, and a second side bin 20 in second wing-shaped chamber 10, both the first and second wing-shaped chambers 9 and 11 being located adjacent to and slightly behind the first bin 12. Each of bins 12, 14, 16, 18 and 20 are generally rectangular in shape and have an upper opening 22 and a lower opening 24, with each lower opening 24 leading to either a standard garbage bag or a more rigid trash container such as a can or pail. As seen in FIG. 5, wall 7 includes a forward portion 25 having a slot 27 in its uppermost portion for reasons explained below. An outer shell 29 encloses the linkages positioned adjacent forward wall portion 25. As shown in FIG. 4, a standard garbage bag 26 is attached to front bin 12 and middle bin 14 through use of an elastic O-ring or spring 28. If deemed desirable, a built-up area 30 (FIG. 4) could be provided adjacent to and slightly upward of each openings 24 in the generally rectangular shaped bins for assistance to the elastic O-ring or spring 28 in holding each garbage bag 26 onto the generally rectangular shaped bins. As shown in FIG. 4, a rigid trash can 31 is placed under the rear bin 16.

As best shown in FIG. 4, apparatus 2 further comprises a front trim member 32 in forward section 4 having a hinged door 34 mounted thereto at pivot point 35. Member 32 serves to support the apparatus in an opening in the wall or window of the house and also serves to trim around the wall or window opening. The upper openings 22 in each of bins 12, 14, and 16 are formed in the floor 5 of main chamber 3. A first door 46 is hingedly secured to floor 5 at point 48 for movement in and out of upper opening 22 of first bin 12 and a second door 50 is hingedly secured to floor 5 at point 52 for movement in and out of upper opening 22 of second bin 14. As shown in FIG. 4, a hanging door 53 is pivotally mounted in main chamber 3 at pivot point 55 for swinging movement within rear bin 16. A first gate 54 (FIG. 5) is hingedly secured to one of the side walls 7 at point 56 for swinging movement away from and towards first side bin 18 (first wing-shaped chamber 9) and a second gate 58 is hingedly secured to the other of side walls 7 at point 59 for swinging movement away from and towards second side bin 2 (second wing-shaped chamber 10). The movement of first door 46, second door 50, first gate 54 and second gate 58 is effected by movement of lever 60 extending through the front 32 of apparatus 2 through linkage and cam means to be later described. Door 53 leading to rear bin 16 is operated by the solid waste impacting upon door 53 when it slides down sloped floor 5 of main chamber 3.

Figure 6:
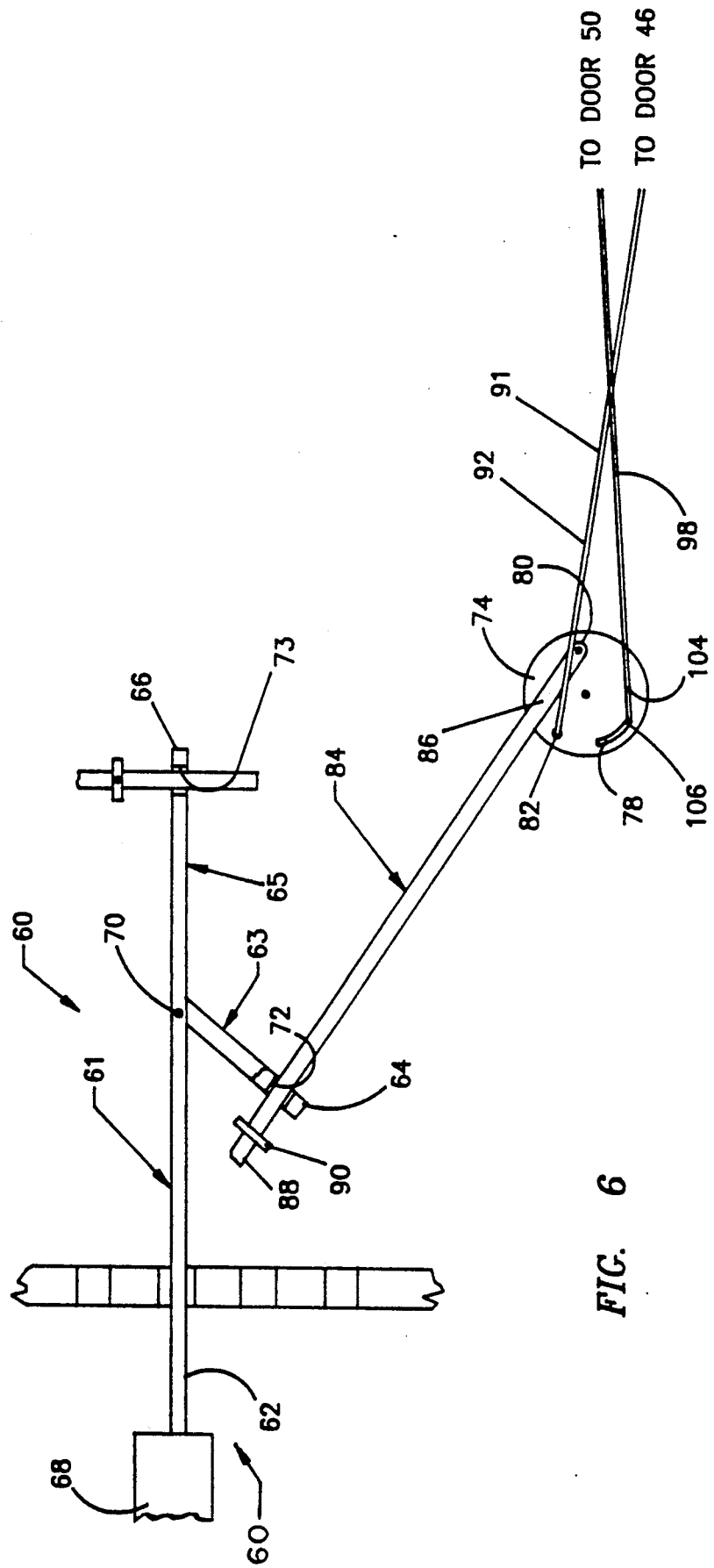
FIG. 6 is an enlarged elevational view of a portion of the linkage for operating the doors in the bottom surface of the main chamber. The portion shown includes the main actuating lever and associated linkage connecting the main lever to a cam wheel which is operatively connected to the doors by the shown linkage elements.

Lever 60 (FIGS. 4 and 6) is of generally a "y" configuration and includes a first arm portion 61 having an end 62, a second, downwardly extending arm portion 63 having an end 64 and a third arm portion 65 having an end 66. Lever 60 has a handle 68 on its first end 62 and is pivotally mounted to one of side walls 7 at a pivot point 70 by any conventional means such as nuts and bolts or a rivet. An opening 72 is in the end 64 of arm portion 63 and an opening 73 is in the end 66 of arm 65. Movement of doors 46 and 50 is controlled by linkage cooperating with opening 72 of arm portion 63 as described hereinbelow. In like manner, movement of gates 54 and 58 are controlled by linkage cooperating with opening 73 of arm portion 65 as described hereinbelow. FIG. 6 illustrates an embodiment wherein lever 60 (including downwardly depending ar portion 63) is a flat bar having a substantially rectangular configuration. A cam wheel 74 is rotatably mounted to one of side walls 7 at point 76 (FIG. 4) and has an elongated arcuate slot 78 and two small round openings 80 and 82 therein A first rod 84 having a first end 86, a second end 88 and a collar 90 adjustably fixed to second end 88 passes through the opening 72 in arm 63 of lever 60 and is rotatably secured to cam wheel 74 by way of small round opening 80 in cam wheel 74. A second rod 91 is rotatably secured to cam wheel 74 at a first end 92 by way of small round opening 82, and is pivotally connected at a second end 94 to pivot point 48 for first door 46 through a first short lever 96. A third rod 98 is secured at its first end 100 to a second short lever 102 fixed to second door 50 at pivot point 52 and has a second end 104 having an extension 106 which is adapted for movement within elongated arcuate slot 78 of cam wheel 74. Cam wheel 74 and its associated rods 91 and 98 cause the selective pivotal movement of doors 46 and 50 in a manner to be explained later.

Figures 7, 8:
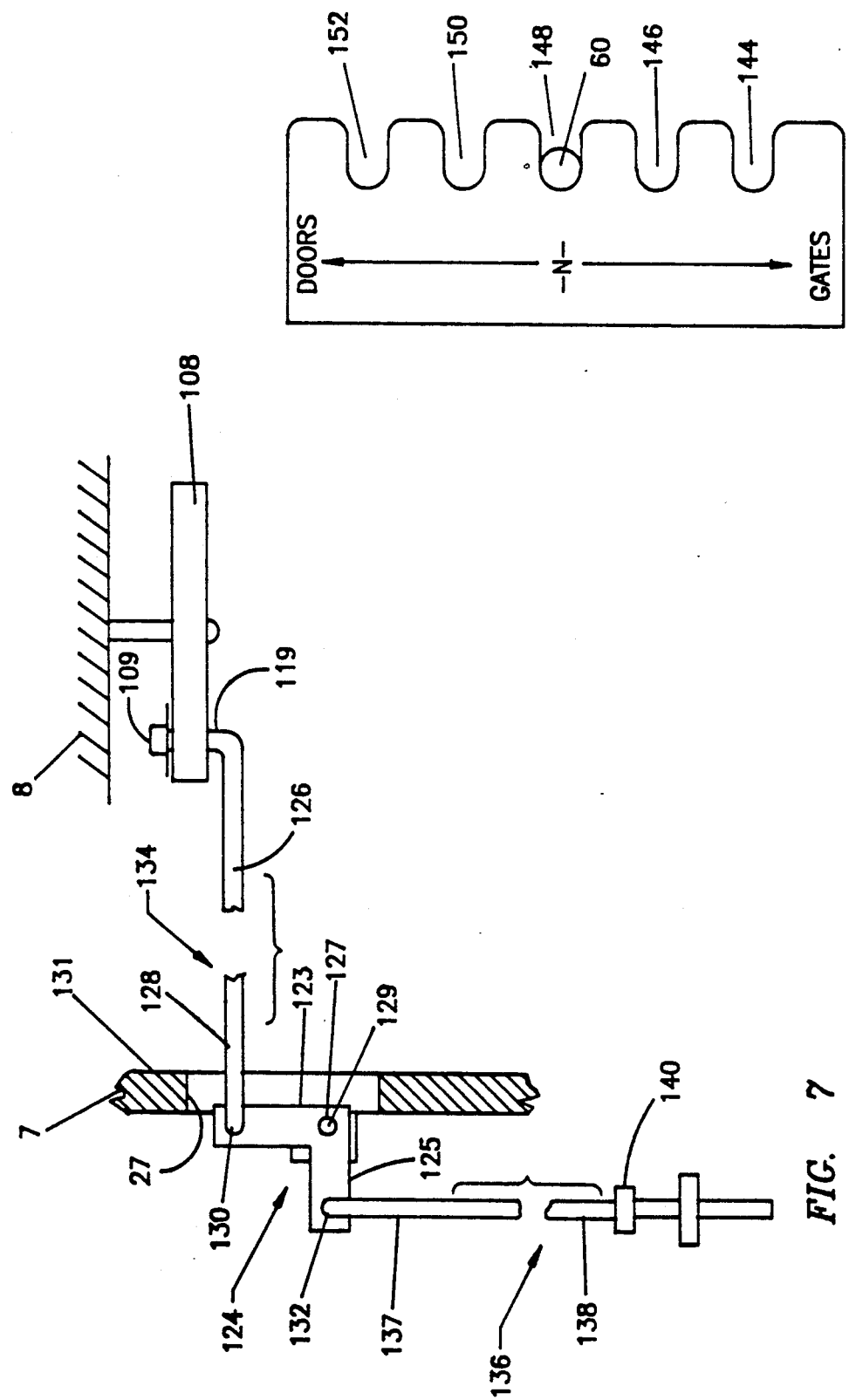
FIG. 7 is a view along line 7—7 of FIG. 4 and illustrates the linkage for operating the side gates of the chambers shown in FIG. 5.
FIG. 8 is a front view of a plate for securement on the front of the apparatus of the present invention for indicating the then existing position of the actuating lever and the doors and gates.

A second cam wheel 108 (FIGS. 5 and 7) for causing movement of gates 54 and 58 is rotatably secured to ceiling 8 (or a support adjacent ceiling 8) of main chamber 3 by any conventional means such as nuts and bolts or a rivet. Second cam wheel 108 has first and second small openings 110 and 112 and an elongated arcuate slot 114 therein. A fourth rod 116 is pivotally secured to a lever 118 fixed to first gate 54 at pivot point 56, and to small opening 110 in second cam wheel 108. A fifth rod 120 is pivotally secured at one end to a lever 122 fixed to second gate 58 at pivot point 59 and is secured at its other end 119 to slide in arcuate slot 114 of second cam wheel 108. The end 119 of fifth rod 120 is secured within arcuate slot 114 of second cam wheel 108 by use of a friction cap 109. A similar friction cap (not shown) is used to secure extension 106 of third rod 98 to first cam wheel 74.

A generally L-shaped lever 124 (FIGS. 4, 5 and 7) having a first leg 123 and a second leg 125 is pivotally secured in slot 27 provided through the upper surface of forward wall portion 25. A pin 127 extends through an opening 129 in L-shaped lever 124 and is secured in brackets 131 and 133 (FIG. 4) mounted adjacent slot 27 to support lever 124 for pivotal movement through slot 27. The first leg 123 has an opening 130 and the second leg 125 has an opening 132 therein. The first leg 123 of lever 124 is connected to second cam wheel 108 through a sixth rod 134 which is pivotally secured to second cam wheel 108 through small opening 112 in cam wheel 108 and the second end 128 of sixth rod 134 is connected to L-shaped lever 124 by way of opening 130. A seventh rod 136 having a first end 137 and a second end 138 connects L-shaped lever 124 by way of opening 132 in L-shaped lever 124 to the end 65 of actuating lever 60. The second end 138 of seventh rod 136 passes through opening 73 in end 66 of lever 60 and an adjustable collar 140 is fixed to second end 138 of seventh rod 136. A spring 141 is secured to the ceiling of first wing-shaped chamber 9 and the pivot lever 122 of gate 58 to assist in returning gate 58 to its closed position A plate 142 having five notches 144, 146, 148, 150 and 152 is attached to the front 32 for positioning lever 60 and to indicate the specific bin which will be receiving the solid waste being placed into apparatus 2.

A complete cycle of operation of the embodiment of the invention depicted in FIGS. 1-8 will now be explained. As the user moves lever 60 upward from its neutral position (notch 148) to its position in notch 150, the seventh rod 136 will slide through opening 73 in third end 66 of lever 60, thus not affecting the gates 54 and 58, while at the same time the surface around the opening 72 in second end 64 of second arm portion 63 of lever 60 grabs the collar 90 on second end 88 of first rod 84 which pulls on first rod 84 to rotate cam wheel 74 approximately fifty degrees to pull on second rod 91 to pull on first short lever 96 to cause first door 46 to pivot upwardly approximately sixty degrees, thus allowing deposited solid waste to drop into front bin 12. During the first approximately fifty degree rotation of cam wheel 74, third rod 98 is not moved to cause movement of second door 50 due to the sliding movement of extension 106 of third rod 98 within elongated arcuate slot 78. Upon further movement of lever 60 from its position in notch 150 to its position in notch 152, the rotational movement of cam wheel 74 causes second rod 91 to reverse direction which closes first door 46 and simultaneously pulls on third rod 98 due to the engagement of extension 106 of third rod 98 with the end of arcuate slot 78 to cause second door 50 to pivot upwardly approximately sixty degrees, thus allowing deposited solid waste to drop into middle bin 14. As the lever 60 is moved downwardly back to its neutral position at notch 148, second door 50 closes and first door 46 reopens and then closes when cam wheel 74 reaches its neutral position (notch 148). Solid waste can be deposited directly into rear bin 16 while cam wheel 74 and lever 60 are in their neutral position (notch 148) due to the solid waste sliding down sloped floor 5 and impacting swinging door 53.

As lever 60 is moved downwardly from its neutral position (notch 148) to its position at notch 146, the first rod 84 will slide through opening 72 in second end 64 of second arm portion 63 of lever 60, thus not affecting the doors 46 and 50, while at the same time the surface around opening 73 in end 66 of third arm portion 65 of lever 60 grabs the collar 140 on second end 138 of sixth rod 134 to cause a push on seventh rod 136 to rotate L-shaped lever 124 and cam wheel 108. The first approximately forty-five degrees of rotation of cam wheel 108 causes the movement of fourth rod 116 which causes the movement of first gate 54 about pivot point 56 to open first gate 54 to cause solid waste to drop into first side bin 18 (first wing-shaped chamber 9). As lever 60 is moved further downwardly from its position at notch 146 to its position at notch 144, the rotation of cam wheel 108 causes first gate 54 to close and simultaneously the end of arcuate slot 114 engages extension 119 on rod 120 to cause the movement of second gate 58 about pivot point 59 to open second gate 58 to cause solid waste to drop into second bin 20 (second wing-shaped chamber 10). As lever 60 is returned to its neutral position (notch 148), second gate 58 closes and first gate 54 opens and then closes when cam wheel 108 reaches its neutral position (notch 148).

While the above description constitutes a preferred embodiment of the present invention, it will be appreciated that the invention is susceptible to modification, variation and change without departing from the proper scope and fair meaning of the accompanying claims.

For example, it is apparent that the invention could encompass as few as two bins with an infinite upper number of bins. It is also readily apparent that the present invention could include an infinite number of bins arranged in tandem or in a straight line such as depicted by bins 12, 14 and 16. If all bins were arranged in tandem or in alignment, it is further apparent that there would be no requirement for first and second gates 54 and 58 and their actuating mechanisms and fewer positions (notches) would be required for lever 60. It is also apparent that other mechanisms (both mechanical and electrical) could be used for actuating the several doors and gates without departing from the proper scope and fair meaning of the claims.

I claim:

1. An apparatus for selective collection of solid waste that has been previously separated into a plurality of categories in a home, said apparatus comprising:
   housing means having passage means including a forward section and an aft section, said forward section opening into the interior of said home for accepting said separated solid waste, said aft section including two side walls and a sloped floor extending exteriorly of said home, said passage means being provided with a door hingedly secured to said forward section;
   a plurality of spaced bins on the exterior of said home and communicating with said aft section of said passage means for receiving said separated solid waste therefrom, said sloped floor having at least one opening therein in communication with at least one of said spaced bins, each of said openings being provided with a door hingedly secured to said sloped floor adjacent to each of said openings for swinging movement for opening and closing its associated opening; and
   control means operable from said forward section of said passage means and in the interior of said home for selectively directing said separated solid waste from said passage means and into a selected one of said plurality of bins.

2. The apparatus of claim 1 wherein said forward section has a slot therein and said control means includes a single actuating lever extending through said slot and first linkage means between said actuating lever and each of said doors for selectively opening and closing each of said doors.

3. The apparatus of claim 2 wherein said first linkage means includes first cam means and at least one rod, said at least one rod being operatively connected to at least one of said doors for opening and closing same.

4. The apparatus of claim 3 wherein said passage means is enclosed by said side walls of said aft section, each said side wall having an aperture therein, and wherein said apparatus further includes first and second wing-shaped chambers, each in communication with one of said apertures in said side walls and extending outwardly from said passage means.

5. The apparatus of claim 4 wherein each of said first and second wing-shaped chambers includes one of said bins, and, a gate hingedly secured to each of said side walls for swinging movement away from and towards its associated aperture.

6. The apparatus of claim 5 wherein said solid waste directing means further includes second linkage means between said actuating lever and each of said gates for selectively opening and closing each of said gates.

7. The apparatus of claim 6 wherein said second linkage means includes second cam means and at least one rod, said at least one rod being operatively connected to one of said gates for opening and closing same.

8. The apparatus of claim 7 including a door hingedly secured to said side walls of said aft section of said passage means in an area slightly forward of said bin most remote from said forward section of said passage means.

9. The apparatus of claim 8 including a ridge around a lower end of at least one of said bins, a garbage bag mounted around and under each said ridge of said bins, an elastic member for engaging each said bag above said ridge for holding each said bag onto its respective said bin, and a rigid container under one of said bins, and, a plate mounted on said forward section of said passage means, said plate having a series of notches therein for receiving said actuating lever and for indicating the said bin which will receive said solid waste.

10. An apparatus for selective collection of solid waste that has been previously separated into a plurality of categories within a home, said apparatus comprising;
- a main chamber including a front portion which communicates into said home and a rear portion which extends outside said home, said rear portion having a sloped floor and a pair of side walls, said slope floor having a plurality of spaced openings therein;
- a frame mounted to said front portion of said main chamber, said frame having a slot therein;
- a plurality of bins secured to said sloped floor, each bin being in communication with one of said openings in said sloped floor;
- a door hinged to said sloped floor adjacent at least one of said openings for movement within said at least one opening to either expose or close off said sloped floor to said bin; and
- door moving means operatable from said front portion of said main chamber for moving said door to expose said sloped floor to its associated bin whereby said solid waste is directed to said bin, said door moving means including an actuating lever which extends through said slot in said frame, and first linkage means connected between said actuating lever and said door for selectively opening and closing said door.

11. The apparatus of claim 10 wherein said first linkage means includes first cam means and at least one rod, said at least one rod being operatively connected to said door for opening and closing same.

12. The apparatus of claim 11 wherein said apparatus further includes an aperture in each of said side walls of said rear portion of said main chamber and wherein said apparatus further includes first and second wing-shaped chambers, each in communication with one of said apertures in said side walls and extending outwardly from said main chamber.

13. The apparatus of claim 12 wherein each of said first and second wing-shaped chambers includes one of said bins and wherein a gate is hingedly secured to each of said side walls for swinging movement away from and towards its associated aperture, and means operatively connected to said actuating lever for selectively moving said first and second gates.

14. The apparatus of claim 13 wherein said selective gate moving means includes second linkage means connected between said actuating lever and each of said gates.

15. The apparatus of claim 14 wherein said second linkage means includes second cam means and at least one rod, said at least one rod being operatively connected to one of said gates for selectively opening and closing same.

* * * * *